(12) United States Patent
Malkamaki et al.

(10) Patent No.: US 11,275,852 B2
(45) Date of Patent: Mar. 15, 2022

(54) SECURITY PROCEDURE

(71) Applicant: Nokia Technologies Oy, Espoo (FI)

(72) Inventors: Esa Mikael Malkamaki, Espoo (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 426 days.

(21) Appl. No.: 16/327,146

(22) PCT Filed: Aug. 22, 2016

(86) PCT No.: PCT/FI2016/050574
§ 371 (c)(1),
(2) Date: Feb. 21, 2019

(87) PCT Pub. No.: WO2018/037149
PCT Pub. Date: Mar. 1, 2018

(65) Prior Publication Data
US 2019/0215686 A1    Jul. 11, 2019

(51) Int. Cl.
*H04W 76/10* (2018.01)
*H04W 12/02* (2009.01)
(Continued)

(52) U.S. Cl.
CPC ............ *G06F 21/606* (2013.01); *G06F 21/60* (2013.01); *H04L 63/0457* (2013.01);
(Continued)

(58) Field of Classification Search
CPC ............ H04W 12/00; H04W 12/0013; H04W 12/0017; H04W 12/005; H04W 12/02; H04W 12/04031; H04W 24/10; H04W 76/10; H04W 76/27; H04W 8/08; H04W 80/02; G06F 21/60; G06F 21/606; H04L 63/0457; H04L 63/0478
See application file for complete search history.

(56) References Cited

U.S. PATENT DOCUMENTS

2014/0016614 A1\* 1/2014 Velev .................... H04W 76/38
                                                        370/331
2015/0118993 A1   4/2015 Rune
(Continued)

OTHER PUBLICATIONS

European Patent Application No. 16914096.9, Extended European Search Report, dated Mar. 3, 2020, 8 pages.
(Continued)

*Primary Examiner* — Khawar Iqbal
(74) *Attorney, Agent, or Firm* — Fay Sharpe LLP

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to establish information to be provided to a base station device, before activation of a first encryption scheme, cause transmission of the information, in a form encrypted using a second encryption scheme, to the base station device, and begin, after causing the transmission of the information, using the first encryption scheme in communication between the apparatus and the base station device

17 Claims, 10 Drawing Sheets

(51) Int. Cl.

| | | |
|---|---|---|
| *G06F 21/60* | (2013.01) | |
| *H04L 29/06* | (2006.01) | |
| *H04W 12/033* | (2021.01) | |
| *H04W 12/037* | (2021.01) | |
| *H04W 12/60* | (2021.01) | |
| *H04W 12/0431* | (2021.01) | |
| *H04W 76/27* | (2018.01) | |
| *H04W 8/08* | (2009.01) | |
| *H04W 24/10* | (2009.01) | |
| *H04W 80/02* | (2009.01) | |

(52) U.S. Cl.
CPC ............ *H04L 63/0478* (2013.01); *H04W 8/08* (2013.01); *H04W 12/02* (2013.01); *H04W 12/033* (2021.01); *H04W 12/037* (2021.01); *H04W 12/0431* (2021.01); *H04W 12/60* (2021.01); *H04W 24/10* (2013.01); *H04W 76/10* (2018.02); *H04W 76/27* (2018.02); *H04W 80/02* (2013.01)

(56) References Cited

U.S. PATENT DOCUMENTS

| | | | | |
|---|---|---|---|---|
| 2016/0088515 | A1* | 3/2016 | Griot | H04L 63/20 370/230 |
| 2018/0007552 | A1* | 1/2018 | Bae | H04L 63/08 |
| 2018/0084452 | A1* | 3/2018 | Griot | H04W 28/0289 |
| 2018/0295125 | A1* | 10/2018 | Lee | H04W 12/069 |
| 2018/0323971 | A1* | 11/2018 | Liu | H04W 12/0433 |
| 2018/0367292 | A1* | 12/2018 | Shi | H04L 9/08 |
| 2019/0021134 | A1* | 1/2019 | Zhang | H04W 76/10 |
| 2019/0052607 | A1* | 2/2019 | Ohlsson | H04L 63/0428 |
| 2019/0174313 | A1* | 6/2019 | Fransen | H04W 12/069 |
| 2019/0306141 | A1* | 10/2019 | Lee | H04L 63/06 |
| 2020/0154503 | A1* | 5/2020 | Han | H04W 76/25 |
| 2020/0260266 | A1* | 8/2020 | Byun | H04W 8/08 |
| 2020/0322789 | A1* | 10/2020 | Salkintzis | H04W 76/14 |

OTHER PUBLICATIONS

PCT Patent Application No. PCT/FI2016/050574, Written Opinion of the International Searching Authority, dated Jan. 26, 2017, 9 pages.
"LTE Security II: NAS and AS Security," NMC Consulting Group, pp. 1-18, 2014.
"LTE Security I: LTE Security Concept and LTE Authentication," NMC Consulting Group, pp. 1-12, 2013.
"S1AP View of LTE Attach & EPS Bearer Setup," EventHelix.com Inc., 6 pages, 2014.
International Search Report for PCT/FI2016/050574 dated Jan. 26, 2017.

* cited by examiner

SECURITY PROCEDURE

FIELD

The present invention relates to data encryption in a communication system.

BACKGROUND

In communication networks, which may comprise wireless and/or wired networks, user equipments may have different modes with respect to the network. For example, in cellular wireless networks, a user equipment may find itself in an idle more or a connected mode.

Idle mode is characterized by a presence of a generic rough location knowledge of the user equipment, which may be referred to as a UE context, and/or an absence of an active communication context between the user equipment and the network. The user equipment may be paged by the network, and the network may be arranged to keep track of the whereabouts of the user equipment. Similarly, the user equipment may invoke a connection establishment process to activate a communication context with the network. An idle mode user equipment may conduct cell re-selection measurements, for example.

Connected mode, on the other hand, may be characterized by more cell-level knowledge of user location and/or presence of an active communication context between the user equipment and the network. Information communicated over such an active communication context may be encrypted, or ciphered, to protect its security while in transit. An active communication context may comprise a protocol structure with a plurality of layers, such that layers are encapsulated in each other, to enable maintenance of the overall connection at different network stages. For example, a physical layer may connect a wireless terminal to a base station or access point, and convey all higher layers as payload of the physical layer. Such higher layers may comprise, for example a transport layer and an application layer conveying as payload information a user may be presented with.

In some technologies, when the user equipment, UE, connects to the network for the very first time, it is neither in idle nor in connected mode. The first connection is then used to register the UE via an initial attachment procedure to the network, so that it becomes aware of the rough location of the user equipment even when it doesn't have an active communication context present. After the initial connection, the user equipment is provided information it needs to connect to the network in subsequent connection attempts, and the network is provided information about a user identity for the subsequent connection attempts. Hence, after the initial attachment, the user equipment can operate in idle and connected mode and the network has a stored UE context.

In connection with a connection establishment procedure, the connection is established and encryption is activated. In order for encryption to work, participating entities must support the same encryption algorithms and modalities, such that data encrypted by a transmitter may be decrypted by a recipient. Decrypting is a term used when referring to reversing, or undoing, an encrypting operation. For example, an encrypting operation obtains a ciphertext from a plaintext, and decryption then obtains the original plaintext from the ciphertext.

Encryption may be activated by the network by transmitting a security command to the user equipment. An example of a security command is the SecurityModeCommand of long term evolution, LTE.

SUMMARY OF THE INVENTION

The invention is defined by the features of the independent claims. Some specific embodiments are defined in the dependent claims.

According to a first aspect of the present invention, there is provided an apparatus comprising a memory configured to store information, at least one processing core configured to receive the information, in encrypted form using a second encryption scheme, from a user equipment, in the apparatus, before activation of a first encryption scheme, obtain an unencrypted form of the information, and use the unencrypted form of the information to provide service to the user equipment before or after the first encryption scheme is activated.

Various embodiments of the first aspect may comprise at least one feature from the following bulleted list:
- the apparatus is configured to process a triggering of the activation of the first encryption scheme during a connection establishment procedure
- the apparatus is configured to obtain the unencrypted form of the information via a core network
- apparatus is configured to obtain the unencrypted form of the information at least partly by requesting an unencryption key from a core network
- the first encryption scheme comprises an access stratum AS encryption scheme
- the second encryption scheme comprises a non-access stratum, NAS, encryption scheme relating to the user equipment
- the apparatus is configured to obtain the unencrypted form of the information by providing the encrypted form of the information to a mobility management entity, and by receiving the unencrypted form of the information from the mobility management entity
- the second encryption scheme comprises an encryption scheme pre-negotiated between the core network and the user equipment
- the apparatus is configured to receive an encryption key from a core network, and to decrypt the information to thereby obtain the unencrypted form
- the information comprises at least one of secondary cell measurement results and a secondary cell configuration requested by the user equipment
- the at least one processing core is configured to cause transmission of a security command comprising an instruction to trigger activation of the first encryption scheme between the user equipment and a network
- the apparatus is comprised in a base station device.

According to a second aspect of the present invention, there is provided an apparatus comprising at least one processing core, at least one memory including computer program code, the at least one memory and the computer program code being configured to, with the at least one processing core, cause the apparatus at least to establish information to be provided to a base station device, before activation of a first encryption scheme, cause transmission of the information, in a form encrypted using a second encryption scheme, to the base station device, and begin, after causing the transmission of the information, using the first encryption scheme in communication between the apparatus and the base station device.

Various embodiments of the second aspect may comprise at least one feature from the following bulleted list:
- information comprises at least one of secondary cell measurement results and a desired secondary cell configuration
- the apparatus is configured to begin using the first encryption scheme responsive to a security command communicated with the base station device, the security command including an instruction to activate the first encryption scheme
- the apparatus is configured to cause the transmission of the information in connection with a connection establishment process
- the apparatus is configured to cause the transmission of the information in a non access stratum container.

According to a third aspect of the present invention, there is provided an apparatus comprising at least one processing core, at least one memory including computer program code, the at least one memory and the computer program code being configured to, with the at least one processing core, cause the apparatus at least to receive an initial UE message from a base station device, perform a cryptographic operation as a response to the initial UE message, and cause transmission of an initial context setup request message as a response to the initial UE message, the initial context setup request message comprising an output of the cryptographic operation.

Various embodiments of the third aspect may comprise at least one feature from the following bulleted list:
- the cryptographic operation comprises decryption of information present in the initial UE message, and the output of the cryptographic operation comprises decrypted information
- the cryptographic operation comprises derivation of an encryption key, and the output of the cryptographic operation comprises the encryption key, the encryption key being distinct from $K_{eNB}$.

According to a fourth aspect of the present invention, there is provided a method comprising storing information in an apparatus, receiving the information, in encrypted form using a second encryption scheme, from a user equipment, in the apparatus, before activation of a first encryption scheme, obtaining an unencrypted form of the information, and using the unencrypted form of the information to provide service to the user equipment before or after the first encryption scheme is activated.

Various embodiments of the fourth aspect may comprise at least one feature corresponding to a feature from the preceding bulleted list laid out in connection with the first aspect.

According to a fifth aspect of the present invention, there is provided a method, comprising establishing information to be provided to a base station device, before activation of a first encryption scheme, causing transmission of the information, in a form encrypted using a second encryption scheme, to the base station device, and beginning, after causing the transmission of the information, using the first encryption scheme in communication between the apparatus and the base station device.

Various embodiments of the fifth aspect may comprise at least one feature corresponding to a feature from the preceding bulleted list laid out in connection with the second aspect.

According to a sixth aspect of the present invention, there is provided a method, comprising receiving an initial UE message from a base station device, performing a cryptographic operation as a response to the initial UE message, and causing transmission of an initial context setup request message as a response to the initial UE message, the initial context setup request message comprising an output of the cryptographic operation.

Various embodiments of the sixth aspect may comprise at least one feature corresponding to a feature from the preceding bulleted list laid out in connection with the third aspect.

According to a seventh aspect of the present invention, there is provided an apparatus comprising means for storing information in an apparatus, means for receiving the information, in encrypted form using a second encryption scheme, from a user equipment, in the apparatus, before activation of a first encryption scheme, means for obtaining an unencrypted form of the information, and means for using the unencrypted form of the information to provide service to the user equipment before or after the first encryption scheme is activated.

According to an eighth aspect of the present invention, there is provided an apparatus comprising means for establishing information to be provided to a base station device, means for causing transmission of the information, before activation of a first encryption scheme, in a form encrypted using a second encryption scheme, to the base station device, and means for beginning, after causing the transmission of the information, using the first encryption scheme in communication between the apparatus and the base station device.

According to a ninth aspect of the present invention, there is provided a non-transitory computer readable medium having stored thereon a set of computer readable instructions that, when executed by at least one processor, cause an apparatus to at least store information in an apparatus, receive the information, in encrypted form using a second encryption scheme, from a user equipment, in the apparatus, before activation of a first encryption scheme, obtain an unencrypted form of the information, and use the unencrypted form of the information to provide service to the user equipment before or after the first encryption scheme is activated.

According to a tenth aspect of the present invention, there is provided a non-transitory computer readable medium having stored thereon a set of computer readable instructions that, when executed by at least one processor, cause an apparatus to at least establish, in an apparatus, information to be provided to a base station device, before activation of a first encryption scheme, cause transmission of the information, in a form encrypted using a second encryption scheme, to the base station device, and begin, after causing the transmission of the information, using the first encryption scheme in communication between the apparatus and the base station device.

According to an eleventh aspect of the present invention, there is provided a non-transitory computer readable medium having stored thereon a set of computer readable instructions that, when executed by at least one processor, cause an apparatus to at least receive an initial UE message from a base station device, perform a cryptographic operation as a response to the initial UE message, and cause transmission of an initial context setup request message as a response to the initial UE message, the initial context setup request message comprising an output of the cryptographic operation.

According to a twelfth aspect of the present invention, there is provided a computer program configured to cause a method in accordance with at least one of the fourth, fifth and sixth aspects to be performed.

EMBODIMENTS

Figure 1:
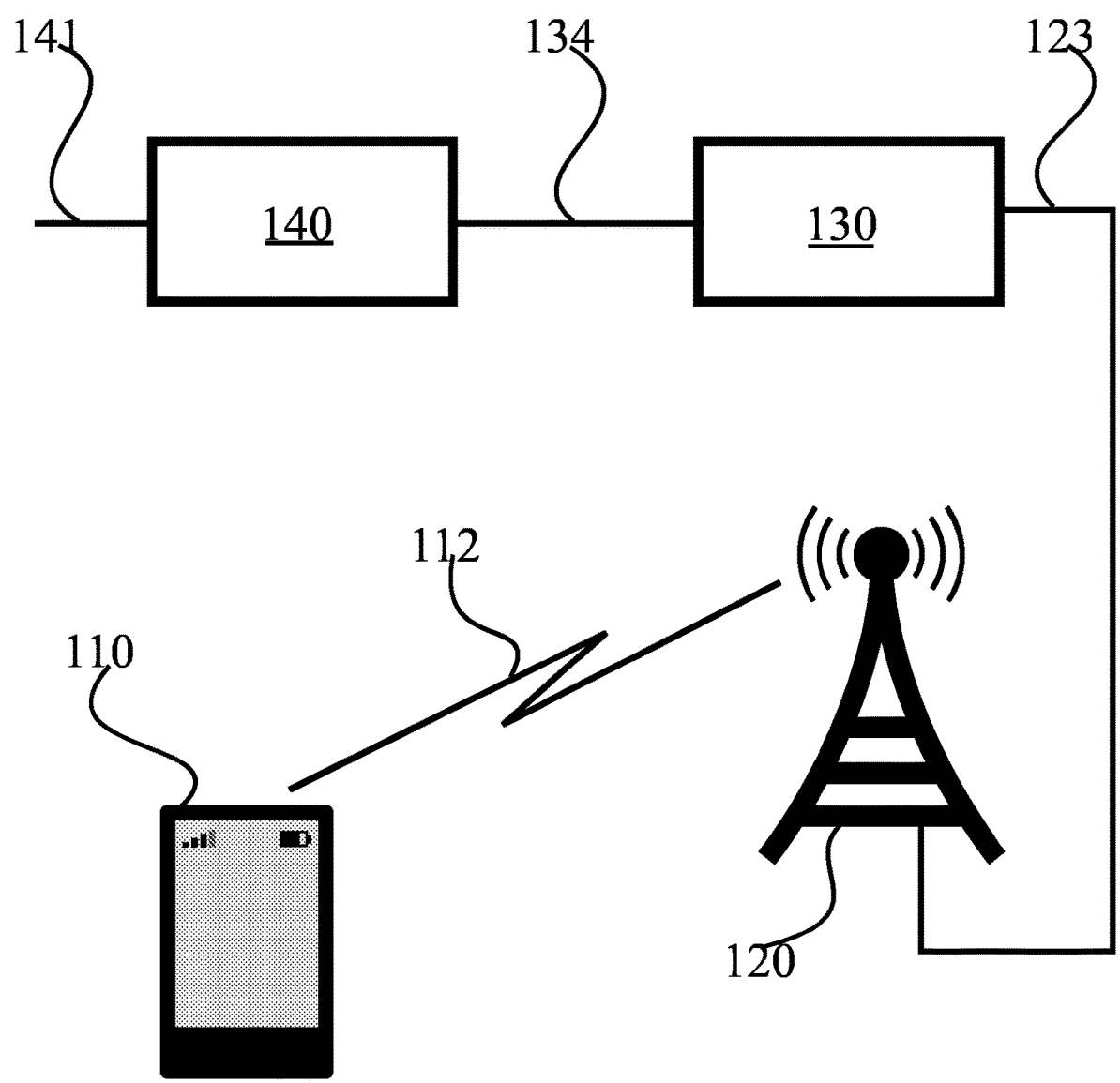
FIG. 1 illustrates an example system in accordance with at least some embodiments of the present invention.

When a user equipment, UE, moves from RRC IDLE to RRC CONNECTED mode the first messages between UE and eNB during random access procedure are sent unciphered, these including, for example, RRCConnectionRequest message over SRB0 in random access Msg3, RRCConnectionSetup message from eNB to UE over SRB0 in random access Msg4 and RRCConnectionSetupComplete from UE to eNB over SRB1 in random access Msg5. The lack of security is natural for the very first message, for example RRCConnectionRequest, since at this initial phase eNB does not know which UE it is communicating with. RRCConnectionSetup message is already sent to a single UE and could in principle be encrypted. The same applies to RRCConnectionSetupComplete message from UE to eNB, it could also be encrypted. However, in current LTE systems encryption is turned on after SecurityModeCommand which is sent to UE after eNB has communicated with MME and received the keys.

Since the initial messages are unciphered, they cannot contain any critical information that would reveal, for example, either the UE location or other UE-specific information that may be used maliciously. UE may have some useful information that could be used by the eNB already in the first RRC reconfiguration after the initial connection setup, but in the current LTE system, security between UE and eNB has to be setup first and only after that the information can be requested from the UE. And only after receiving the additional information from the UE, eNB can perform another RRC reconfiguration taking that information into account.

In this invention we propose new security mechanisms such that UE could send relevant information encrypted to eNB in an earlier phase such that the eNB can take the UE information into use already in the first RRC reconfiguration after security mode command, for example.

Transmitting information in encrypted form from a user equipment to a base station already before activation of communication context encryption, or ciphering, may provide benefits, such as a reduced delay before the base station can act on the received information. By communication context encryption, or context encryption, it is meant encryption employed in encrypting information transmitted in the communication context of a connected state, that is, for example, the communication context that is present as a prerequisite for connected state. It is also sometimes called access stratum, AS, encryption or security. Certain information types are not suitable for transmission in unencrypted format, wherefore at least some embodiments of the invention provide for early transmission of information in encrypted form. In detail, a non-access stratum, NAS, container and security may be used, or a dedicated early encryption key may be derived for use in connection establishment prior to activation of the communication context encryption. Advantageously, for example, the base station may at least receive information from the user equipment and potentially also reconfigure a connection with the user equipment, using the information, already before communication context encryption is active.

By NAS it is meant a functional layer in a protocol stack, the layer being arranged between a UE and a core network. This layer may be used to manage establishments of communication sessions and/or maintaining continuous connectivity with a UE as it moves, for example. In an LTE system, once a UE has performed an initial attach procedure with the network, it has a UE context stored within the mobility management entity, MME.

FIG. 1 illustrates an example system in accordance with at least some embodiments of the present invention. The system comprises a user equipment, UE, 110, which may comprise a smartphone, mobile phone, tablet computer, laptop computer, desktop computer or indeed another kind of suitable device. UE 110 is in wireless communication with a base station 120, via wireless link 112. Base station is a term employed frequently when discussing radio nodes in cellular communication systems, however in the context of the present document it should be appreciated that also non-cellular systems are envisaged to benefit from embodiments of the present invention, and are not to be excluded by this terminological choice. Access point is a term often employed when discussing non-cellular radio nodes.

Base station 120, wireless link 112 and UE 110 are arranged to operate in accordance with a communication standard, to thereby obtain interoperability. For example, wideband code division multiple access, WCDMA, and long term evolution, LTE, and 5G are cellular communication standards. On the other hand, wireless local area network, WLAN, and worldwide interoperability for microwave access, WiMAX, are examples of non-cellular communication standards. While described herein as a wireless communication system, other embodiments of the invention may be implemented as wired communication systems. Wired communication standards include Ethernet, for example. In case of a wired communication system link 112 is not wireless but wired.

Base station 120 is coupled, via connection 123, with node 130. Node 130 may be comprised as node in a core network or a radio access network, for example. Node 130 may comprise a mobility management entity, MME, or switch, for example. Connection 123 may comprise a wired connection, wireless connection or a partly wireless connection. Connection 123 may be used to convey payload traffic between node 130 and base station 120. Node 130 is coupled with gateway 140 via connection 134, and gateway 140 is, in turn, coupled with further networks via connection 141. Connections 134 and 141 may comprise wire-line connections, for example. Wire-line connections may comprise Ethernet and/or fibre-optic connections, for example.

Via base station 120, node 130 and gateway 140, UE 110 may communicate with correspondent entities, which may be servers on the Internet, telephone endpoints in domestic or foreign locations or, for example, banking services in an corporate extranet.

When transitioning from an idle state to a connected state, UE 110 may trigger establishment of at least one physical channel over link 112. In detail, UE 110 may trigger a connection establishment process including, such as, for example, a random access procedure. For example, UE 110 may transmit a random access preamble to base station 120, which may reply with a random access response. UE 110 may then transmit a connection request to base station 120, an example of a connection request being a RRCConnectionRequest message in accordance with the LTE system.

Once base station 120 has responded to a connection request message, for example by transmitting a connection setup message, and received a connection setup complete message from the UE 110, base station 120 may consult node 130, or another node, to obtain context information relating to UE 110. Node 130 may comprise an MME, for example. The context information may comprise an encryption key to be used in communication context encryption. An example of a connection setup complete message is a RRCConnectionSetupComplete message in accordance with an LTE system, and an example of a context encryption key is $K_{eNB}$. Other technologies have similar messages and keys.

A security command may be transmitted to UE 110 from base station 120 to cause the context encryption to be activated. A security command may comprise at least one of the following: information on a ciphering algorithm to use, information on an integrity algorithm to use and a message authentication code—integrity, MAC-I, field. A MAC-I field may be used to ensure message integrity, for example. After the security command is received and acted on in UE 110, encryption of information in the communication context may be accomplished using the context encryption. Alternatively, a security command may be known as a security instruction.

From the point of view of base station 120, context encryption is activated when the security command is sent and from the point of view of UE 110, context encryption is activated when the security command is received and processed. Base station 120 may thus trigger the activation of the context encryption, although in some embodiments a triggering message may be transmitted by UE 110.

On the other hand, UE 110 may have information that may be useful to provide to base station 120 already before context encryption is active. Such information may comprise secondary cell measurement results and/or a secondary cell configuration desired by UE 110, for example. In case such information is of a kind that requires encryption, encrypting the information would be beneficial, but since context encryption is not yet active, another encryption may be used. Such information may be used by base station 120 to provide service to the user equipment, in other words, the information may be intended for use in base station 120, and not merely provided to base station 120 for forwarding for use in further nodes. Base station 120 may provide service by using the information, for example to configure an aspect of UE 110. The another encryption, used before context encryption is available, will be referred to herein as early encryption as it may be employed in connection with a connection establishment process before context encryption is used. Early encryption may be used also at other times.

Figure 2:
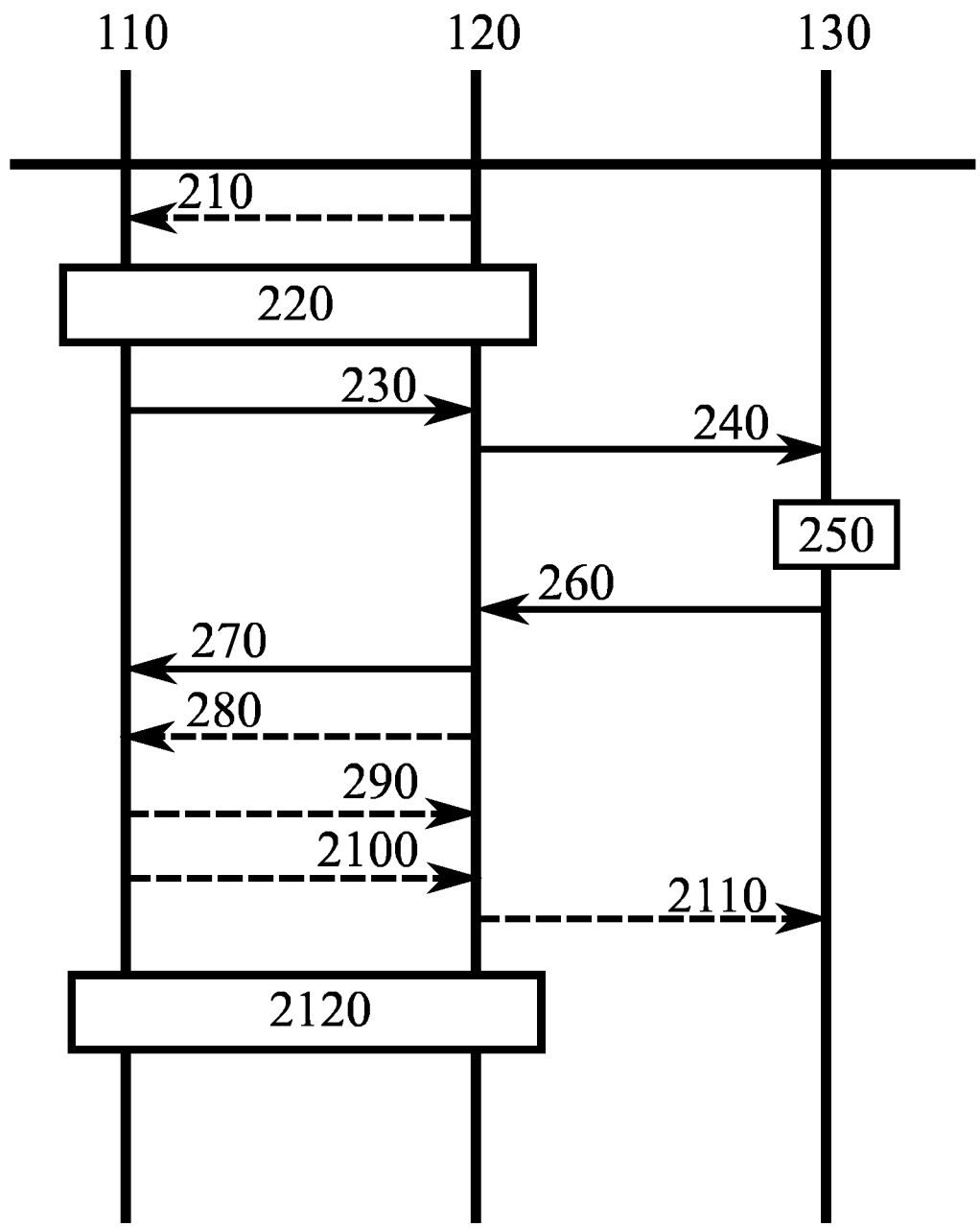
FIG. 2 illustrates an example embodiment of early encryption in accordance with principles of the invention.
Figure 4:
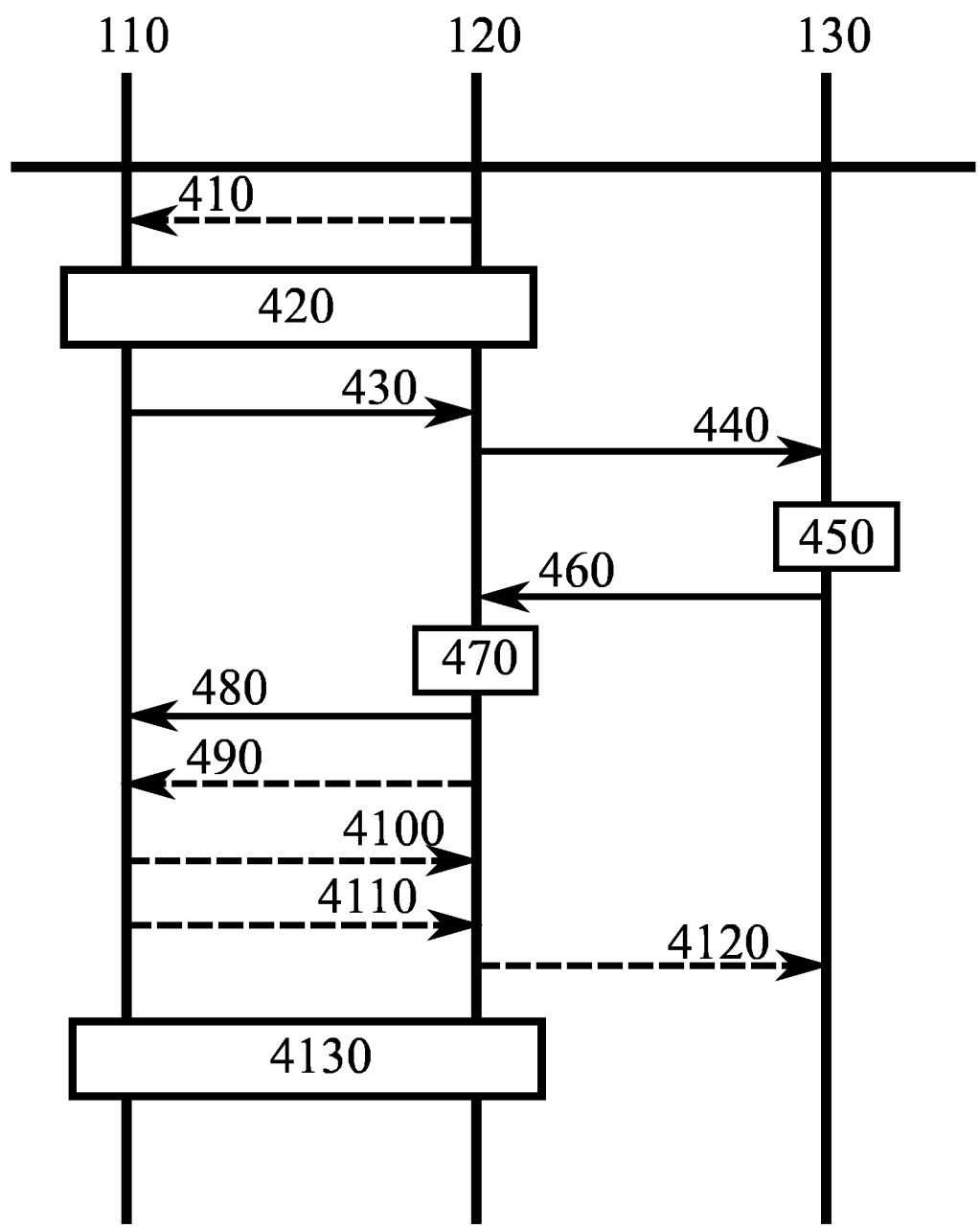
FIG. 4 illustrates an example embodiment of early encryption in accordance with principles of the invention.
Figure 5:
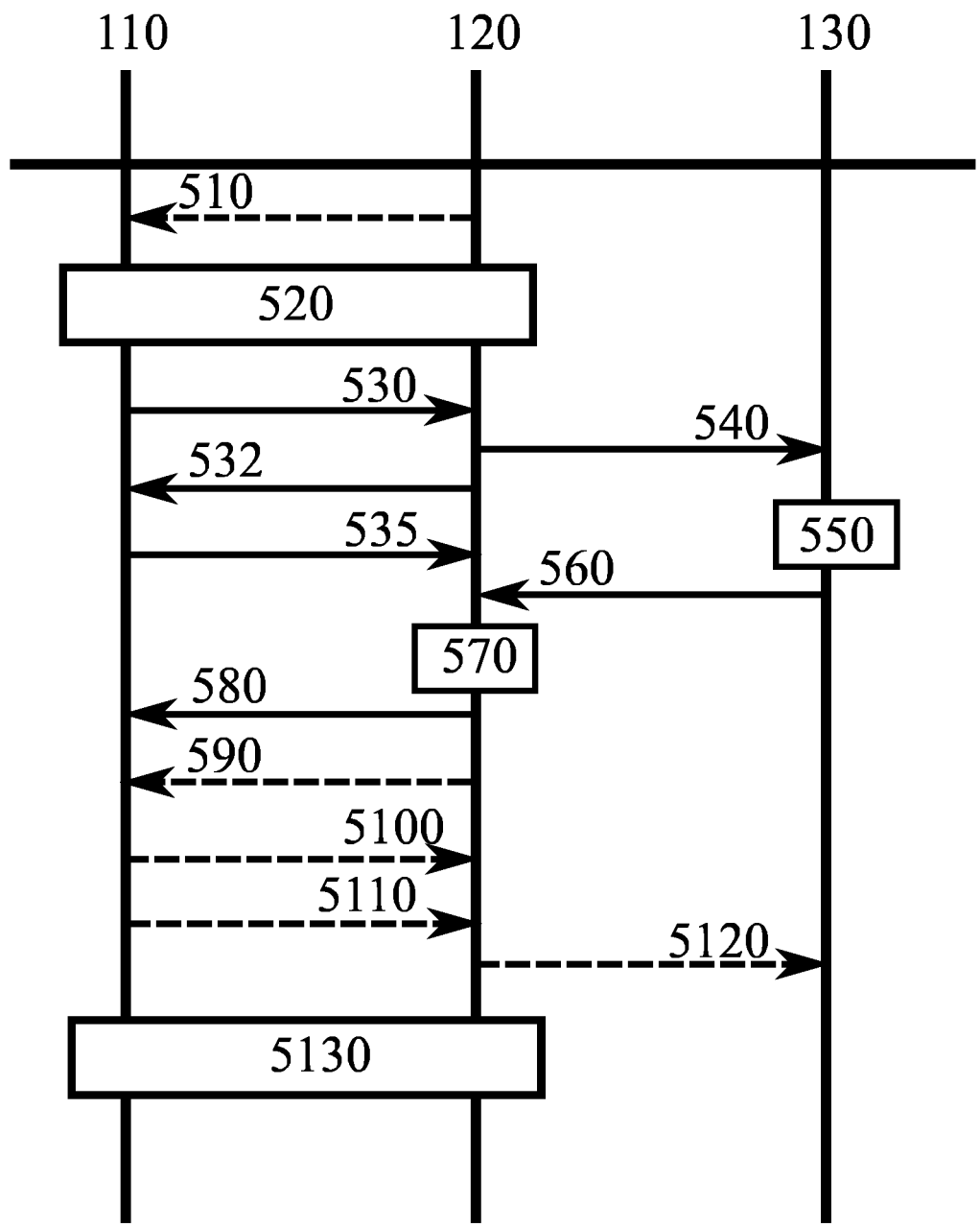
FIG. 5 illustrates an example embodiment of early encryption in accordance with principles of the invention.

FIG. 2 illustrates an example embodiment of early encryption in accordance with principles of the invention. On the vertical axes are disposed, from the left to the right, UE 110, base station 120 and node 130. Node 130 may comprise a MME in this embodiment, for example. Time advances from the top toward the bottom. The overall process of FIG. 2, like those of FIG. 4 and FIG. 5, is a transition from idle state to connected, or active, state.

In phase 210, base station 120 may page UE 110. This phase is optional, as the invention is equally applicable to mobile-originated communications. Phase 220 comprises, for example, a random access process to obtain radio resources for communication between UE 110 and base station 120. Phase 220 may comprise, for example, RRC connection request and setup messages exchanged between UE 110 and base station 120, which form part of a RRC connection establishment procedure.

Phase 230 comprises a message transmitted from UE 110 to base station 120, the message comprising information intended for use in base station 120, the information being in the message in encrypted form. The message itself may be a RRC connection setup complete message, for example, but in various embodiments the message may go under different names. The message of phase 230 is transmitted before context encryption is yet active between UE 110 and base station 120. The information, in encrypted form, may be in a NAS container, for example. The use of NAS encryption provides the early encryption in embodiments in accordance with FIG. 2. Early encryption is distinct from context encryption.

In phase 240, base station 120 communicates with node 130 in connection with the connection establishment procedure. In phase 240, base station 120 provides the NAS container it has received in phase 230 to node 130. Node 130 decrypts the NAS container in phase 250, and returns the information, in unencrypted form, to base station 120 in phase 260. Further, in phase 260 node 130 may instruct base station 120 concerning the connection establishment, for example by providing an encryption key for use in the context encryption.

Once in receipt of information provided in phase 260, base station may apply the information that was provided under the early encryption in phase 230. Phase 270 comprises transmission of a security command from base station 120 to UE 110, the security command being described herein above. Phases 280 to 2110 are provided as technological context and are described in light of an LTE system, however in different communication technologies these phases may proceed in differing manners. In detail, phase 280 may comprise a connection reconfiguration, which may comprise an addition of a secondary cell in accordance with the information communicated to base station 120 using the early encryption. Phase 280 and phase 270 may be transmitted in a same transport block. Phase 290 may comprise a security command response, for example a security mode complete message, and phase 2100 may comprise a connection reconfiguration complete message, responsive to completion of a reconfiguration instructed in phase 280. Phase 2110 may comprise an initial context setup response, in response to messaging of phase 260. In general, base station 120 may be configured to reconfigure a connection with UE 110, using the information provided under the early encryption, for example before the context encryption is active.

Phase 2120 comprises communication of data between UE 110 and the network, the information being secured using the context encryption which is active at this point.

Figure 3:
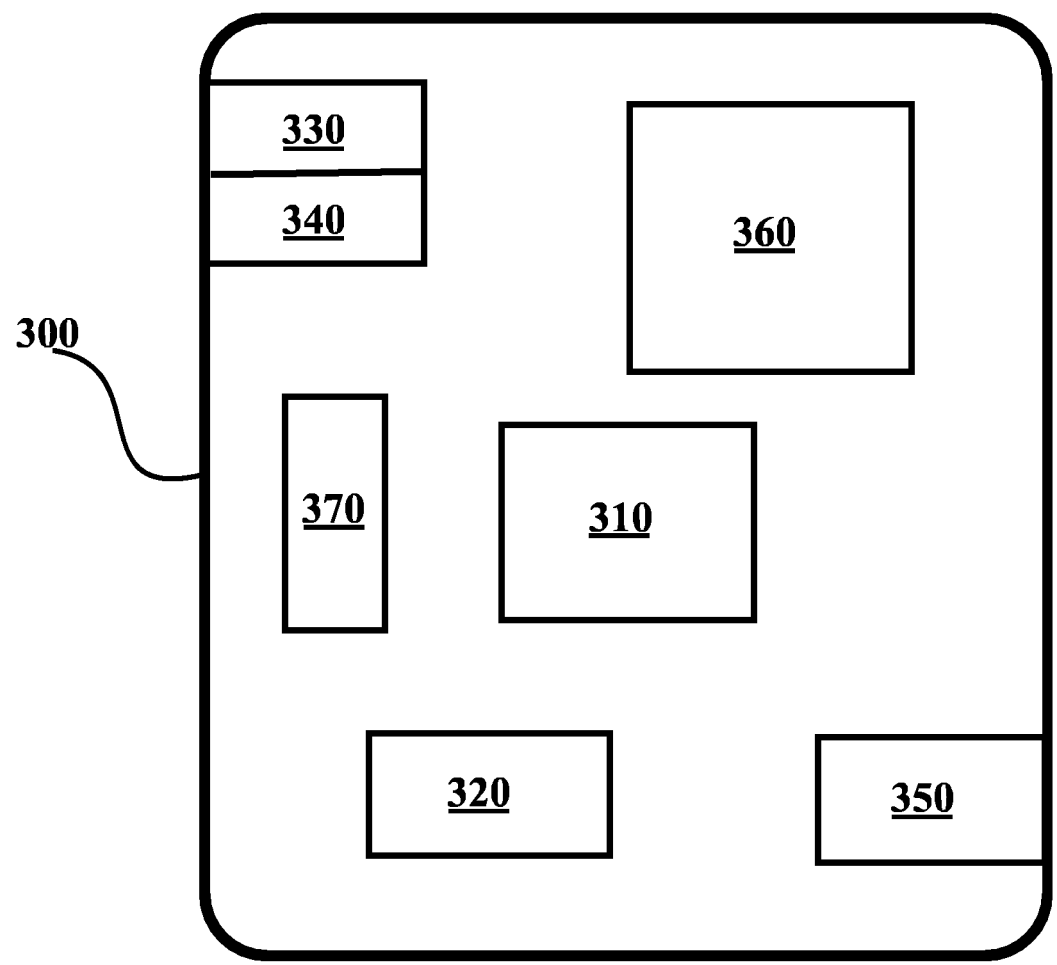
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as UE 110 or, in applicable parts, base station 120 of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

FIG. 4 illustrates an example embodiment of early encryption in accordance with principles of the invention. On the vertical axes are disposed, as in FIG. 2, UE 110, base station 120 and node 130.

Phases 410 to 420 correspond to phases 210 and 220 of FIG. 2, respectively.

Phase 430 comprises a message transmitted from UE 110 to base station 120, the message comprising information intended for use in base station 120, the information being in the message in encrypted form. The message itself may be a RRC connection setup complete message, for example, but in various embodiments the message may go under different names. The message of phase 430 is transmitted before context encryption is yet active between UE 110 and base station 120. The information, in encrypted form, may be encrypted using an early encryption key. The early encryption key may be generated, for example in connection with an initial attachment of UE 110 with the network. The early encryption key may be generated using a Diffie-Hellman exchange, for example. The use of the early encryption key provides the early encryption in embodiments in accordance with FIG. 4 The early encryption key may be established in a NAS layer procedure, for example. Alternatively to a NAS procedure, a default integrity/ciphering algorithm could be defined and the keys could be defined without negotiating between UE and MME.

FIGS. 4 and 5 illustrate embodiments where new, temporary, security would be defined between the UE and the base station, which in LTE is an eNB. The new early encryption key could be derived, in LTE technology, from $K_{ASME}$ in UE and in MME and MME would provide the key to eNB when requested by eNB. eNB would request the early encryption key when it would receive early-encrypted UE information. Early encryption key request could be added to some existing message(s) over S1, such as, for example, INITIAL UE MESSAGE, or a new message could be created for it. And the early encryption key could be provided to eNB in some existing message, such as, for example, INITIAL CONTEXT SETUP REQUEST where also $K_{eNB}$ is provided, or a new message could be defined. eNB could then decipher the early-encrypted UE information with the early encryption key or a key derived from the early encryption key received from MME. In addition to early (de)ciphering key, eNB and UE could derive also an early integrity protection key from the early encryption key. The early integrity key could be used to integrity protect the messages sent by the UE. The advantage of these alternatives is that information received from the UE need not be sent to MME for deciphering and returned back to the eNB for use. In general, a security scheme may comprise an integrity protection scheme and/or an encryption scheme. An encryption scheme, in turn, may comprise early encryption or context encryption, for example.

In phase 440, base station 120 communicates with node 130 in connection with the connection establishment procedure. In phase 440, base station 120 requests the early encryption key to be provided to base station 120. Node 130 retrieves, generates or re-generates the early encryption key in phase 450, and provides it to base station 120 in phase 460. Further, in phase 460 node 130 may instruct base station 120 concerning the connection establishment, for example by providing an encryption key for use in the context encryption. In other words, phase 460 may comprise node 130 providing two encryption keys to base station 120, namely the key for context encryption and the key for early encryption.

Base station 120 may use the early encryption key to decrypt, in phase 470, the information provided by UE 110 in phase 430, to thereby obtain the information in unencrypted form.

Once in receipt of the information provided in phase 430, in unencrypted form, base station 120 may apply the information that was provided under the early encryption in phase 430. Phase 480 comprises transmission of a security command from base station 120 to UE 110, the security command being described herein above. Phases 490 to 4120 are provided as technological context and are described in light of an LTE system, however in different communication technologies these phases may proceed in differing manners. In detail, phase 490 may comprise a connection reconfiguration, which may comprise an addition of a secondary cell in accordance with the information communicated to base station 120 using the early encryption. Phase 490 and phase 480 may be transmitted in a same transport block. Phase 4100 may comprise a security command response, for example a security mode complete message, and phase 4110 may comprise a connection reconfiguration complete message, responsive to completion of a reconfiguration instructed in phase 490. Phase 4120 may comprise an initial context setup response, in response to messaging of phase 460, for example. In general, base station 120 may be configured to reconfigure a connection with UE 110, using the information provided under the early encryption, for example before the context encryption is active.

Phase 4130 comprises communication of data between UE 110 and the network, the information being secured using the context encryption which is active at this point.

FIG. 5 illustrates an example embodiment of early encryption in accordance with principles of the invention. The embodiment of FIG. 5 resembles that of FIG. 4 in that an early encryption key is used. Phases 510 and 520 correspond to phases 410 and 420 of FIG. 4, respectively.

Phase 530 comprises a message transmitted from UE 110 to base station 120, the message comprising an indication that information intended for use in base station 120 is available in UE 110. The message comprising the indication does not comprise the information itself. The information may be of the type that requires ciphering to transmit, while being useful to base station 120 already before context encryption is active. The message of phase 530 may be a RRC connection setup complete message, for example, but in various embodiments the message may go under different names. The message of phase 530 is transmitted before context encryption is yet active between UE 110 and base station 120.

Responsive to the indication of phase 530, base station 120 may request the indicated information to be provided from UE 110 to base station 120. Such a request is illustrated in FIG. 5 as phase 532. For example, the information may comprise secondary cell measurement information, or a desired secondary cell configuration. Phases 540 and 532 may take place at more or less the same time, or one before or after the other. As the information will be provided from UE 110 using early encryption, where base station 120 requests for the information, base station 120 also requests for the early encryption key from node 130. Such requesting may be comprised in phase 540.

The information, in encrypted form, may be encrypted using the early encryption key. The early encryption key may be generated, for example in connection with an initial attachment of UE 110 with the network. The early encryption key may be generated using a Diffie-Hellman exchange, for example. The use of the early encryption key provides the early encryption in embodiments in accordance with FIG. 5

In phase 540, base station 120 communicates with node 130 in connection with the connection establishment procedure. In phase 540, base station 120 requests the early encryption key to be provided to base station 120. Node 130 retrieves, generates or re-generates the early encryption key in phase 550, and provides it to base station 120 in phase 560. Further, in phase 560 node 130 may instruct base station 120 concerning the connection establishment, for example by providing an encryption key for use in the context encryption. In other words, phase 560 may comprise node 130 providing two encryption keys to base station 120, namely the key for context encryption and the key for early encryption.

UE 110 may provide the information, in encrypted form, to base station 120 in phase 535, as a response to the requesting of phase 532. Base station 120 may use the early encryption key to decrypt, in phase 570, the information provided by UE 110 in phase 535, to thereby obtain the information in unencrypted form.

Once in receipt of the information provided in phase 535, in unencrypted form, base station may apply the information that was provided under the early encryption in phase 535. Phase 580 comprises transmission of a security command from base station 120 to UE 110, the security command being described herein above. Phases 590 to 5120 are provided as technological context and are described in light of an LTE system, however in different communication technologies these phases may proceed in differing manners. In detail, phase 590 may comprise a connection reconfiguration, which may comprise an addition of a secondary cell in accordance with the information communicated to base station 120 using the early encryption. Phase 5100 may comprise a security command response, for example a security mode complete message, and phase 5110 may comprise a connection reconfiguration complete message, responsive to completion of a reconfiguration instructed in phase 590. Phase 5120 may comprise an initial context setup response, in response to messaging of phase 560, for example. In general, base station 120 may be configured to reconfigure a connection with UE 110, using the information provided under the early encryption, for example before the context encryption is active.

Phase 5130 comprises communication of data between UE 110 and the network, the information being secured using the context encryption which is active at this point.

An advantage of FIG. 4 and FIG. 5 embodiments is that the information, which is sensitive enough to require encryption, is not communicated between the base station and node 130. An advantage of the FIG. 5 embodiment is that the message of phase 530 does not increase in size, as the information is not automatically included therein, and base station 120 is merely enabled to request the information if it is useful in the prevailing circumstances. The described security scheme may be useful also with suspend/resume, namely, when the UE connection is resumed, all secondary cells, including the entirety of the secondary cell group, SCG, are released. Hence, when the UE requests a resumption of a previously suspended connection, it may indicate that it may utilize also carrier aggregation in accordance with a new primary cell configuration, which may benefit from the present invention. The described security mechanism may also be usable with 5G or other cellular technologies with idle-to-connected transitions where security needs to be activated prior to UE sending any measurement information to eNB.

Figure 6:
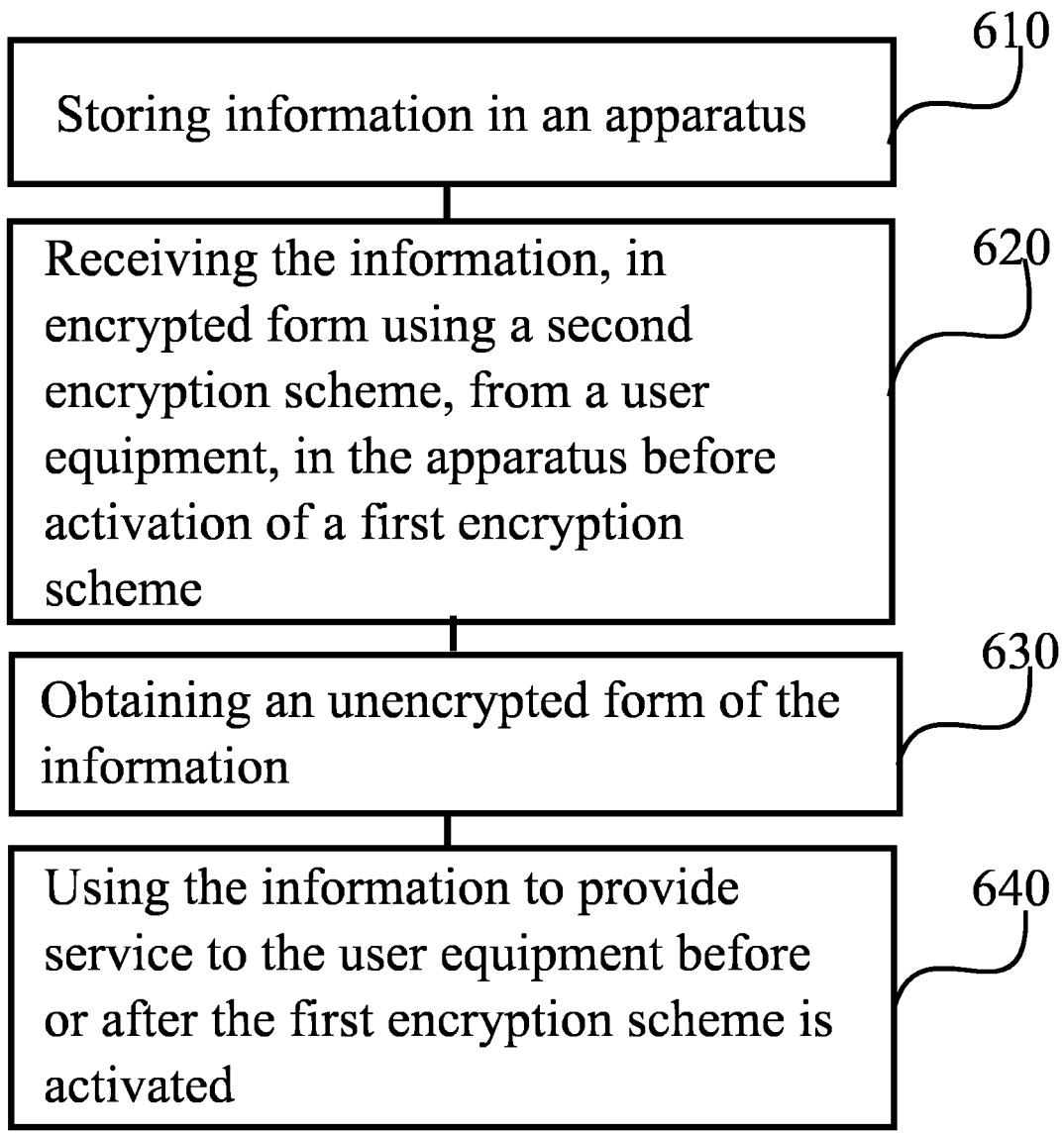
FIG. 6 is a flow graph of a method in accordance with at least some embodiments of the present invention.

FIG. 6 is a flow graph of a method in accordance with at least some embodiments of the present invention. The phases of the illustrated method may be performed in base station 120, for example, or in a control device configured to control the functioning thereof, when implanted therein.

Phase 610 comprises storing information in an apparatus. Phase 620 comprises receiving the information, in encrypted form using a second encryption scheme, from a user equipment, in the apparatus, before activation of a first encryption scheme. Phase 630 comprises obtaining an unencrypted form of the information. Finally, phase 640 comprises using the unencrypted form of the information to provide service to the user equipment before or after the first encryption scheme is activated.

Figure 7:
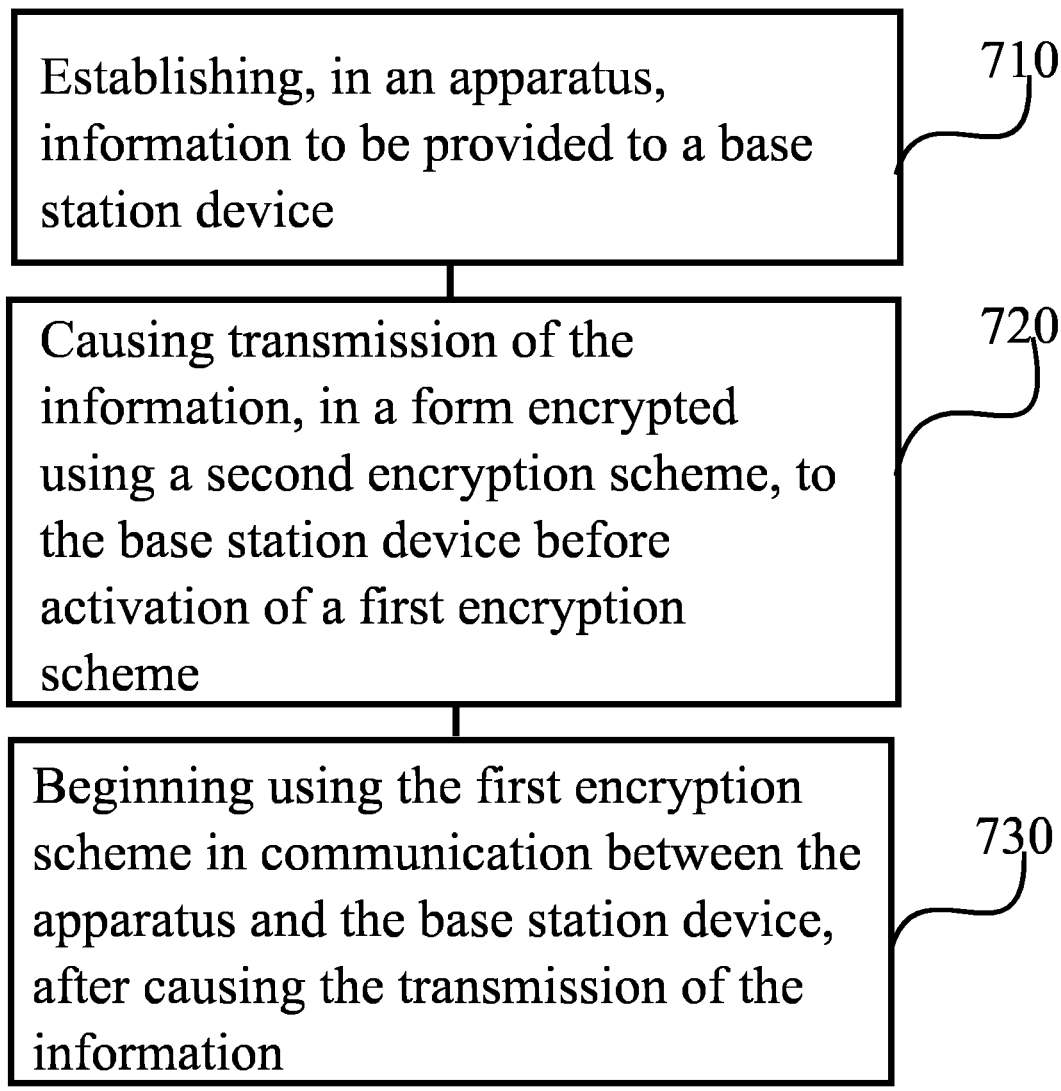
FIG. 7 is a flow graph of a method in accordance with at least some embodiments of the present invention.

FIG. 7 is a flow graph of a method in accordance with at least some embodiments of the present invention. The phases of the illustrated method may be performed in UE 110, for example, or in a control device configured to control the functioning thereof, when implanted therein.

Phase 710 comprises establishing information to be provided to a base station device. Phase 720 comprises, before activation of a first encryption scheme, causing transmission of the information, in a form encrypted using a second encryption scheme, to the base station device. Finally, phase 730 comprises beginning using the first encryption scheme in communication between the apparatus and the base station device, after causing the transmission of the information.

Figure 8:
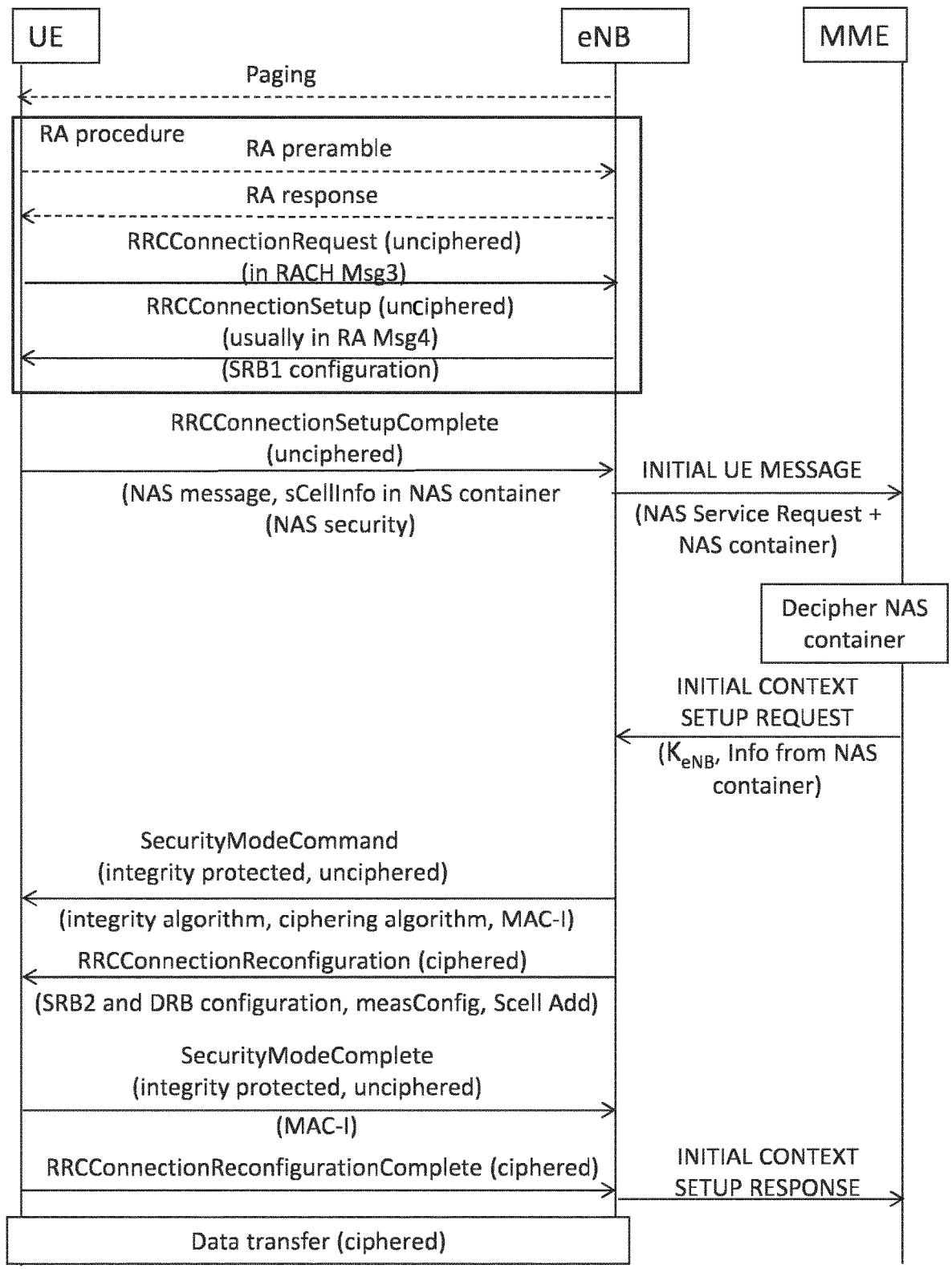
FIG. 8 is an example embodiment in accordance with principles of the present invention.
Figure 9:
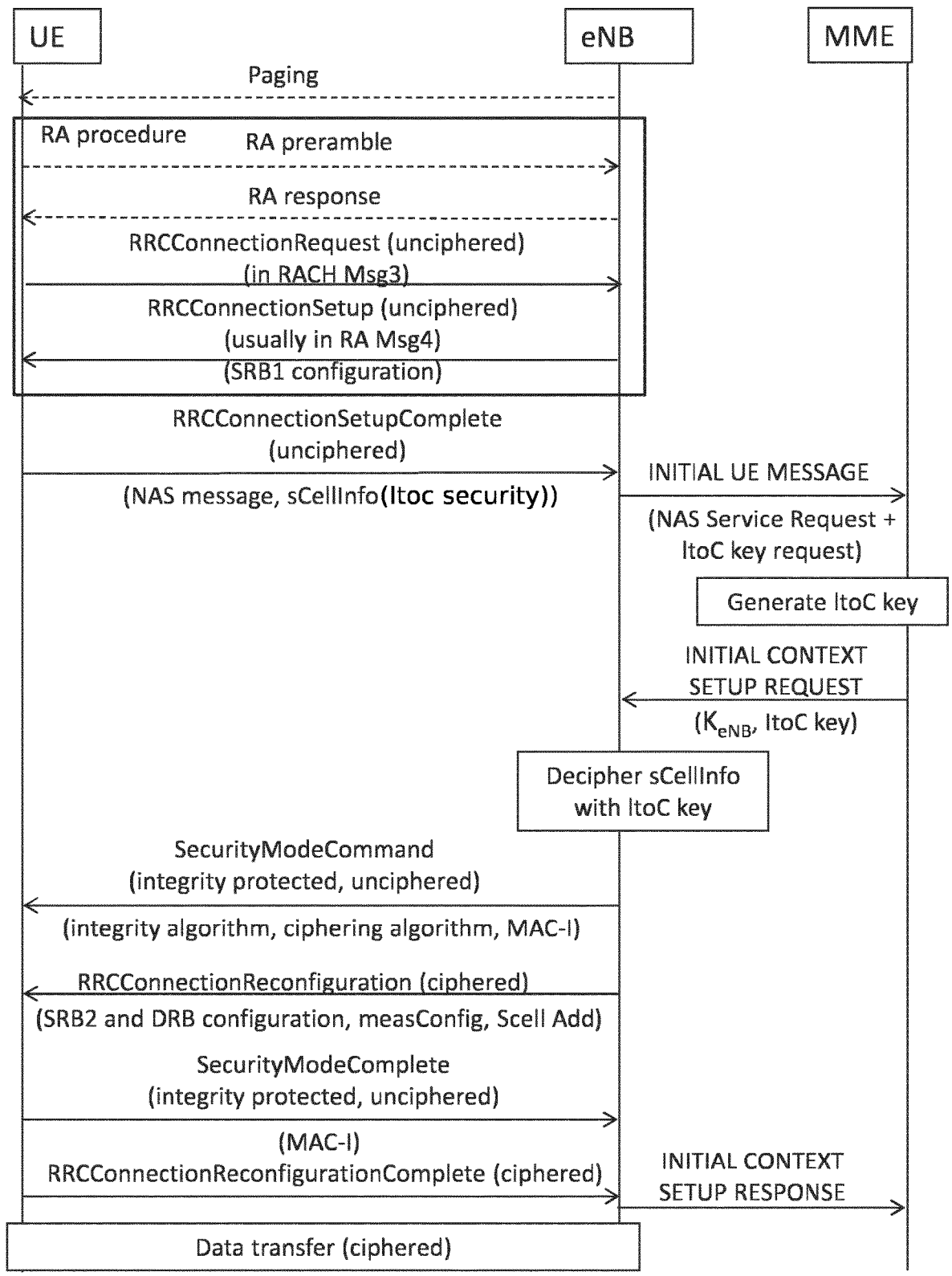
FIG. 9 is an example embodiment in accordance with principles of the present invention.
Figure 10:
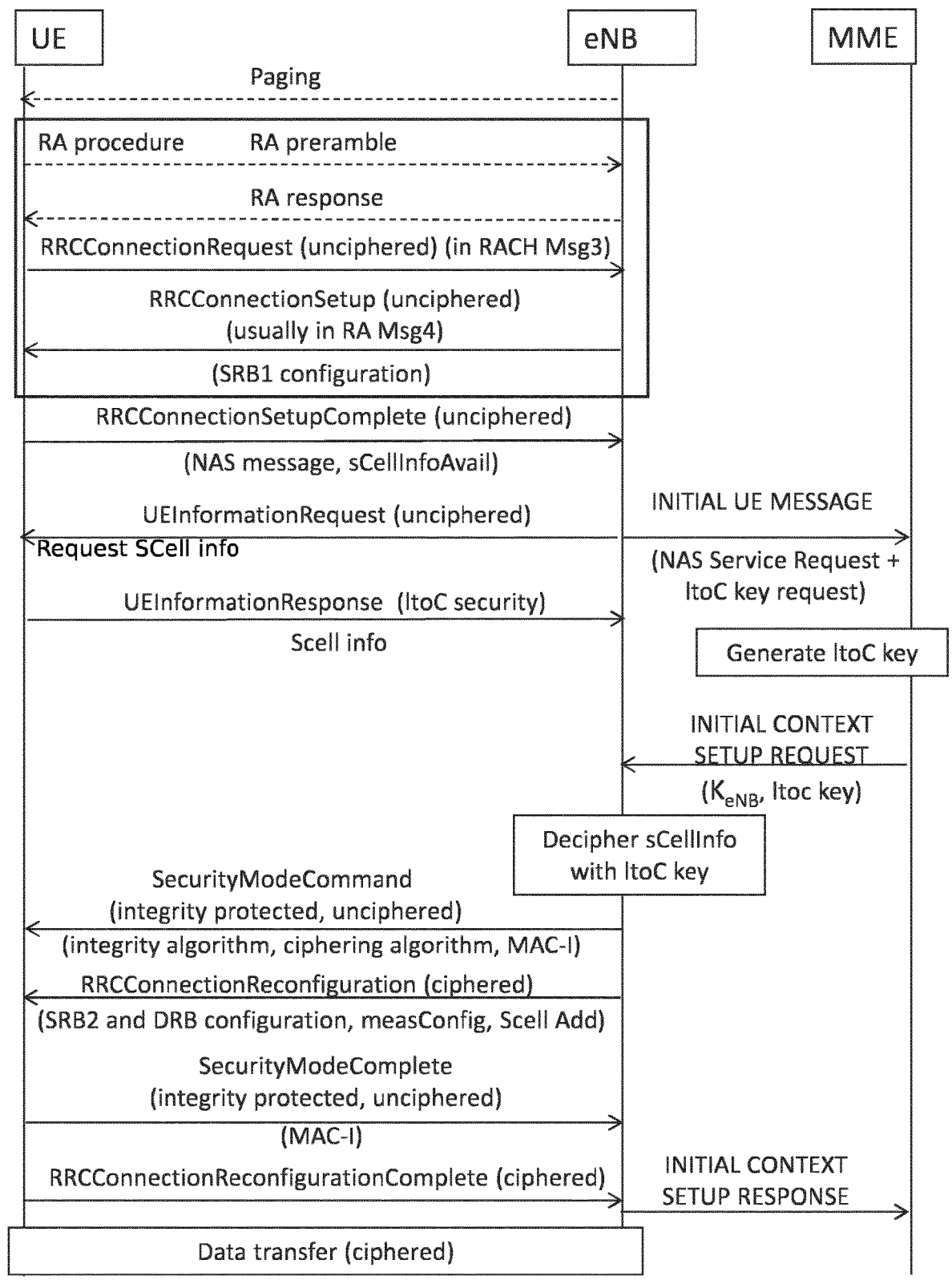
FIG. 10 is an example embodiment in accordance with principles of the present invention.

Further example embodiments with example message names and contents are shown in FIGS. 8, 9 and 10. They are examples of embodiments in FIGS. 2, 4 and 5, respectively. We propose to use a pre-defined encryption when sending UE-specific information to eNB, along with explicit or implicit indication to eNB of whether the key information or decrypted message needs to be retrieved via MME.

In particular, one possibility, illustrated in FIG. 8, would be to use existing NAS encryption keys, negotiated at ATTACH time, also to encrypt the information sent by UE, in addition to a normal NAS message. Then the UE Information should be sent to MME, which would decrypt it and return the unciphered message to eNB before, during or after the normal context setup procedure.

Alternatively, FIGS. 9 and 10, the UE information could be encrypted using a new temporary idle-to-connected, "ItoC" mode encryption scheme such that the keys are negotiated between UE and MME at ATTACH time. Then, eNB would request the keys from MME when receiving UE Information and there would not be need to send UE Information to MME and return it back to eNB.

Using NAS security for sending UE info intended for the eNB is depicted in FIG. 8. In the figure, SCell measurement results or desired/indicated/requested SCell configuration (sCellInfo) is used as an example of possible UE info that is intended for eNB. A new NAS message could be specified for this purpose, for example 'NAS UE info to eNB' message which would contain a container for the control info intended for eNB. In this embodiment, the new NAS message with the container is sent over S1 to MME which would decipher the contents of the container and return the decrypted UE info to eNB as part of the next S1 message, for example INITIAL CONTEXT SETUP REQUEST message. Alternatively, a new S1 messages could be defined for this purpose. In the figure, the new NAS message is sent over the air as part of RRCConnectionSetupComplete message. Alternatively, a new RRC message could be defined. The advantage of this alternative is that no new security keys are needed. The existing NAS keys would be reused.

FIGS. 9 and 10 illustrate alternatives where new, temporary, security would be defined between the UE and eNB. The new idle-to-connected "ItoC" key, or early encryption key, could be derived from $K_{ASME}$ in UE and/or in MME and MME could provide the key to eNB when requested by eNB. eNB would request the ItoC key when it would receive encrypted UE info. ItoC key request could be added to some existing message(s) over 51, for example INITIAL UE MESSAGE, or a new message could be created for it. And the new ItoC key, $K_{ItoC}$, could be provided to eNB in some existing message, such as, for example, INITIAL CONTEXT SETUP REQUEST where also $K_{eNB}$ is provided, or a new message could be defined. eNB could then decipher the UE info with a key derived from $K_{ItoC}$. The advantage of these alternatives is that UE info is not sent to MME.

In FIG. 9, the UE information is provided within RRC-ConnectionSetupComplete message.

FIG. 10 illustrates an alternative where the UE information is requested by eNB, for example by UEInformationRequest message, and sent within, for example, UEInformationResponse message using the new ItoC early encryption. In this alternative UEInformationRequest and UEInformationResponse messages are sent before normal security activation, that is, before SecurityModeCommand, which is not allowed in prior versions of specifications. The request itself may be transmitted without ciphering since eNB does not, yet, have the new key.

An advantage of this alternative is that RRCConnectionSetupComplete message does not grow much, only growing by the indication of new UE information. Compared to legacy UE information transfer, the transfer could be started already before normal security activation by using the new ItoC security.

The new ItoC security could be temporary and it would only be used until normal security between UE and eNB is activated.

To create the ItoC key, either a new NAS level procedure between UE and MME should be defined, similar to NAS security mode command, or for this purpose a default integrity/ciphering algorithm could be defined and the keys could be defined without negotiating between UE and MME and/or eNB.

The new, early, security mechanism could be used also with 5G or other cellular technologies with idle-to-connected transition where security needs to be activated prior to UE sending any measurement information to eNB.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in enhancing data security and/or reducing delays in initiating connectivity.

ACRONYMS LIST 5G fifth generation
LTE long term evolution
MME mobility management entity
NAS non access stratum
RACH random access channel
RRC radio resource control
SCG secondary cell group
UE user equipment
WCDMA wideband code division multiple access
WiMAX worldwide interoperability for microwave access
WLAN wireless local area network

| REFERENCE SIGNS LIST | |
|---|---|
| 110 | UE (user equipment) |
| 120 | base station |
| 130 | node |
| 140 | gateway |
| 112 | wireless link |
| 123, 134, 141 | connections |
| 210-2120 | phases of the method of FIG. 2 |
| 300-370 | structure of the device of FIG. 3 |
| 410-4130 | phases of the method of FIG. 4 |
| 510-5130 | phases of the method of FIG. 5 |
| 610-640 | phases of the method of FIG. 6 |
| 710-730 | phases of the method of FIG. 7 |

The invention claimed is:

1. A base station apparatus comprising:
at least one processing core,
at least one memory including computer program code,
the at least one memory and the computer program code being configured to, with the at least one processing core, cause the apparatus at least to
receive information, in encrypted form using a second encryption scheme, directly from a user equipment, in the apparatus, before activation of a first encryption scheme, the first encryption scheme being a communication context encryption scheme;

obtain an unencrypted form of the information;
use the unencrypted form of the information to provide service to the user equipment before or after the first encryption scheme is activated; and
process a triggering of the activation of the first encryption scheme during a connection establishment procedure;
wherein the information comprises at least one of secondary cell measurement results and a secondary cell configuration requested by the user equipment.

2. The base station apparatus according to claim 1, wherein the apparatus is further caused to obtain the unencrypted form of the information via a core network.

3. The base station apparatus according to claim 1, wherein the apparatus is further caused to obtain the unencrypted form of the information at least partly by requesting an unencryption key from a core network.

4. The base station apparatus according to claim 1, wherein the first encryption scheme comprises an access stratum AS encryption scheme.

5. The base station apparatus according to claim 1, wherein the second encryption scheme comprises a non-access stratum, NAS, encryption scheme relating to the user equipment.

6. The base station apparatus according to claim 1, wherein the apparatus is further caused to obtain the unencrypted form of the information by providing the encrypted form of the information to a mobility management entity, and by receiving the unencrypted form of the information from the mobility management entity.

7. The base station apparatus according to claim 1, wherein the second encryption scheme comprises an encryption scheme pre-negotiated between the core network and the user equipment.

8. The base station apparatus according to claim 1, wherein the apparatus is further caused to receive an encryption key from a core network, and to decrypt the information to thereby obtain the unencrypted form.

9. The base station apparatus according to claim 1, wherein the at least one processing core is configured to cause transmission of a security command comprising an instruction to trigger activation of the first encryption scheme between the user equipment and a network.

10. A user equipment apparatus comprising
at least one processing core,
at least one memory including computer program code,
the at least one memory and the computer program code being configured to, with the at least one processing core, cause the apparatus at least to:
establish information to be provided to a base station device;
before activation of a first encryption scheme, cause transmission of the information, in a form encrypted using a second encryption scheme, directly to the base station device, the first encryption scheme being a communication context encryption scheme; and
begin, after causing the transmission of the information, use of the first encryption scheme in communication between the apparatus and the base station device;
wherein the information comprises at least one of secondary cell measurement results and a desired secondary cell configuration.

11. The user equipment apparatus according to claim 10, wherein the apparatus is further caused to begin using the first encryption scheme responsive to a security command communicated with the base station device, the security command including an instruction to activate the first encryption scheme.

12. The user equipment apparatus according to claim 10, wherein the apparatus is further configured to cause the transmission of the information in connection with a connection establishment process.

13. The user equipment apparatus according to claim 10, wherein the apparatus is further configured to cause the transmission of the information in a non-access stratum container.

14. A method, comprising:
establishing information to be provided from a user equipment to a base station device;
before activation of a first encryption scheme, causing transmission of the information, in a form encrypted using a second encryption scheme, directly from the user equipment to the base station device, the first encryption scheme being a communication context encryption scheme; and
beginning, after causing the transmission of the information, use of the first encryption scheme in communication between the user equipment and the base station device;
wherein the information comprises at least one of secondary cell measurement results and a desired secondary cell configuration.

15. The method according to claim 14, wherein use of the first encryption scheme is begun responsive to a security command communicated from the base station device to the user equipment, the security command including an instruction to activate the first encryption scheme.

16. The method according to claim 14, wherein the information is caused to be transmitted in connection with a connection establishment process.

17. The method according to claim 14, wherein the information is caused to be transmitted in a non-access stratum container.

* * * * *